United States Patent
Racov et al.

(10) Patent No.: US 7,266,892 B2
(45) Date of Patent: Sep. 11, 2007

(54) DEVICE FOR A PORTABLE TOOL SUCH AS A BRUSH CUTTER

(75) Inventors: Mikael Racov, Huskvarna (SE); Kjell Jacobsson, Jönköping (SE); Fredrik Vadsten, Gränna (SE); Bernt Käller, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 138 days.

(21) Appl. No.: 10/845,899

(22) Filed: May 11, 2004

(65) Prior Publication Data

US 2005/0006114 A1    Jan. 13, 2005

(30) Foreign Application Priority Data

May 22, 2003   (SE) .................................... 0301503

(51) Int. Cl.
*B26B 27/00* (2006.01)
*B26B 25/00* (2006.01)

(52) U.S. Cl. ...................... 30/276; 30/296.1
(58) Field of Classification Search .................. 30/276, 30/DIG. 5, 296.1
See application file for complete search history.

(56) References Cited

U.S. PATENT DOCUMENTS

| | | | | |
|---|---|---|---|---|
| 4,091,536 A | * | 5/1978 | Bartholomew | 30/276 |
| 4,586,322 A | * | 5/1986 | Yokocho et al. | 56/12.7 |
| 4,817,738 A | * | 4/1989 | Dorner et al. | 173/162.1 |

* cited by examiner

*Primary Examiner*—Kenneth E. Peterson
*Assistant Examiner*—Sean Michalski
(74) *Attorney, Agent, or Firm*—Pearne & Gordon LLP

(57) ABSTRACT

This invention relates to a device for a portable tool, such as a brush cutter or the like, comprising a shaft tube (11) that via a shaft tube securing means is connected to a drive unit (10). The shaft tube securing means comprises a first sleeve shaped element (14) enclosing an inner end of the shaft tube (11) and a second sleeve shaped element (13) arranged between the first sleeve shaped element (14) and a surrounding tube shaped recess (13) in the drive unit (10). The sleeve shaped element (13) is provided with one or several portions (14f) co-operating with an abutment surface (16) in the tube shaped recess (13) in order to limit the turning movement of the shaft tube (11) with respect to the drive unit (10) when being influenced by overloads.

6 Claims, 2 Drawing Sheets

DEVICE FOR A PORTABLE TOOL SUCH AS A BRUSH CUTTER

This invention relates to a device for a portable tool, such as a brush cutter a pole saw a pole hedge trimmer or the like, comprising a shaft tube that via a shaft tube securing means is connected to a drive unit, the shaft tube securing means comprising a first sleeve shaped element enclosing one inner end of the shaft tube and a second sleeve shaped element arranged outside the first sleeve shaped element in a surrounding, tube shaped recess of the drive unit Arrangements of the type described above are previously known, see for instance U.S. Pat. No. 4,817,738, and are used on products on the market because of the simple design and the simplicity of assembling the details. A drawback with this arrangement is however that the elongated drive shaft, that is enclosed in the shaft tube and that transfers the power from the drive unit to a rotating saw blade or a saw chain at the outer end of the shaft tube, sometimes becomes damaged because the arrangement is exposed to large bending moments from the operator. Such large moments often occur when the operator tries to start the engine by pulling the starting strap and simultaneously puts his knee on the shaft tube in order to keep the tool firmly. These bending moments sometimes cause the shaft tube to tilt too much with respect to the drive unit thereby creating unacceptable forces on the drive shaft.

The purpose of this invention is to create an arrangement which still is simple and easy to assemble but which does not have the disadvantages described above. The arrangement is such that the bending moment on the drive shaft is limited to an acceptable level and this is achieved by means of a device having the characteristics mentioned in the claims.

Figure 1:
Figure 2:
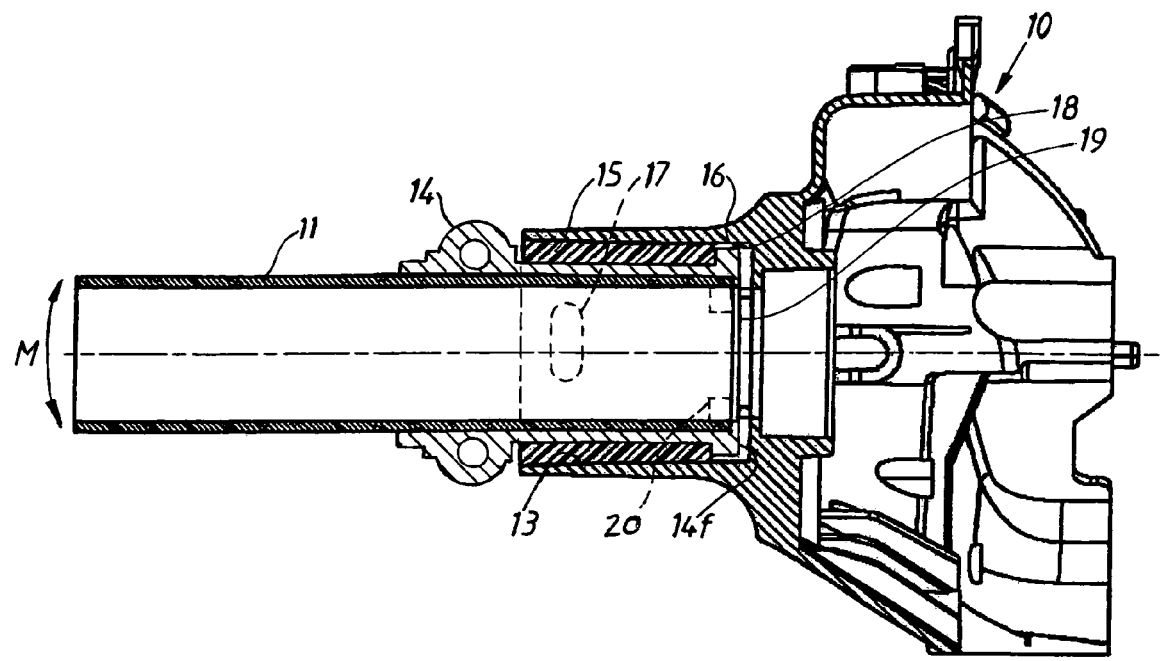
Figure 3:
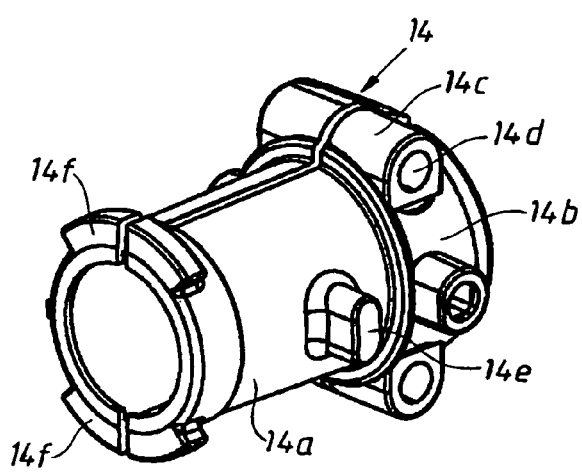

An embodiment of the invention will now be described with reference to the accompanying drawings on which FIG. 1 is a perspective view of a portable tool of the type to which this invention is applicable, FIG. 2 is a vertical section through the shaft tube securing part of the drive unit and FIG. 3 is a perspective view of a detail of the shaft securing arrangement.

FIG. 1 shows a pole saw having a drive unit 10 that via a shaft tube 11 is connected to a cutting unit 12. The drive unit 10 encloses a drive source such as an combustion engine or an electric motor (not shown) and the shaft tube 11 encloses a an elongated drive shaft (not shown) transferring the power from the drive source to the cutting unit.

The drive unit 10 is provided with a tubular recess 13 in which an inner end of the shaft tube 11 is inserted. The shaft tube end is surrounded by a first sleeve shaped element 14 and this element is partly surrounded by a second sleeve shaped element 15 which is made of elastic material such as rubber. The part of the drive unit that constitutes the recess 13 and the first sleeve shaped element 14 are made of a harder material, preferably metal, than the second sleeve shaped element 15. The recess 13 has an annular wall part 16 that serves as an abutment surface in a way which will be explained below The first sleeve shaped element 14, that comprises two separate halves, has a tubular portion 14a which is inserted in the recess 13 and an exterior portion 14b that is placed outside the recess 13. The exterior portion 14b of the two halves are provided with lugs 14c having openings 14d through which bolts can be inserted in order to clamp the sleeve shaped element 14 to the shaft tube. The first sleeve shaped element 14 also has a projection 14e that extends through an opening in the second sleeve shaped element 15 and is inserted into an opening 17 provided in the wall of the recess 13. The inner end of the combined element 14 is further provided with two radially outwards extending arc shaped shoulders 14f that are separated from one another in the circumferential direction. The outer diameter of the shoulders is somewhat less than the diameter of the recess 13 such that a small gap 18 is created between the annular wall part 16 of the recess 13 and the periphery of the shoulders 14f.

The second sleeve shaped element 15, that also comprises two separate halves, is placed between the tubular portion 14a of the first sleeve shaped element 14 and the wall of the recess 13 and has an inner end that is provided with two recesses 20 in which the shoulders 14f fit. Consequently the material of the second sleeve shaped element 15 which is placed between the shoulders 14f as well as the first sleeve shaped element 14 extend out to the inner end 19 of the shaft tube 11.

The device operates in the following manner. If the operator grabs the tool and applies a bending moment M in the direction shown in FIG. 2 for instance when starting up the engine by pulling the starting strap and simultaneously holding the shaft tube firmly this moment causes a turning motion about the projection 14e of the shaft tube 11 with respect to the drive unit 10. If the movement becomes too large the upper or lower shoulder 14f will abut the annular wall part 16 which means that the movement is limited such that there is no risk for damaging the drive shaft enclosed in the shaft tube 11.

The invention claimed is:

1. A portable tool that has a drive unit (10) including a tube shaped recess (13) and an abutment surface (16), and a shaft tube (11) connected to the drive unit at a first end, and connected to a cutting unit at a second end, (10), the portable tool comprising: a shaft tube securing means securing the shaft tube to the drive unit, the shaft tube securing means comprising a first sleeve shaped element (14) enclosing an inner end (19) of the shaft tube (11) and a second sleeve shaped element (15) arranged outside the first sleeve shaped element (14) in the tube shaped recess (13) of the drive unit (10), characterized in that the first sleeve shaped element (14) is provided with at least one portion (14f) configured not to abut the abutment surface (16) of the drive unit (10) in the tube shaped recess (13) when the shaft tube is not being influenced by overloads and to abut the abutment surface (16) of the drive unit (10) in the tube shaped recess (13) in order to limit the turning movement of the shaft tube (11) with respect to the drive unit (10) when being influenced by overloads, wherein said at least one portion is shaped as a flange extending radially outwards at the inner end of the shaft tube.

2. Portable tool according to claim 1 characterized in that at least one of said sleeve shaped elements (14, 15) is constituted of at least two separate parts.

3. Portable tool according to claim 1 characterized in that the first sleeve shaped element (14) is provided with at least one projection (14e) that extends through the second sleeve element (15) into a recess (17) in the drive unit (10).

4. Portable tool according claim 1 characterized in that the first sleeve shaped element (14) is provided with several portions (14f) that, as seen in the axial direction of the element, are arranged at a distance from one another.

5. Portable tool according to claim 4 characterized in that an inner end of the second sleeve shaped element (15) is provided with recesses (20) in which said portions (14*f*) are placed.

6. Portable tool according to claim 1 characterized in that the first sleeve shaped element (14) and a part of the drive unit (10) that constitutes the tube shaped recess (13) are made of hard material, such as metal, whereas the second sleeve shaped element (15) is made from a softer material such as rubber.

* * * * *